(12) United States Patent  
Mills et al.

(10) Patent No.: US 7,793,390 B2  
(45) Date of Patent: Sep. 14, 2010

(54) METHOD OF AND APPARATUS FOR CONNECTING FLOATING COVERS

(75) Inventors: James Andrew Mills, Edmonton (CA); Jason Jeffery Robert MacQueen, Edmonton (CA)

(73) Assignee: Layfield Geosynthetics & Industrial Fabrics Ltd., Edmonton (CA)

( * ) Notice: Subject to any disclaimer, the term of this patent is extended or adjusted under 35 U.S.C. 154(b) by 507 days.

(21) Appl. No.: 11/833,922

(22) Filed: Aug. 3, 2007

(65) Prior Publication Data

US 2009/0007394 A1   Jan. 8, 2009

(51) Int. Cl.  
*F16L 3/00* (2006.01)

(52) U.S. Cl. ............... 24/129 R; 248/304; 248/305; 248/61; 248/63; 411/401; 4/498; 4/503

(58) Field of Classification Search ............... None  
See application file for complete search history.

(56) References Cited

U.S. PATENT DOCUMENTS

| | | | |
|---|---|---|---|
| 2,950,727 A | 8/1960 | Dunn | |
| 3,564,794 A | 2/1971 | Price | |
| 3,763,606 A | 10/1973 | Rindebong | |
| 3,811,454 A | 5/1974 | Huddle | |
| 3,862,876 A | 1/1975 | Graves | |
| 4,036,244 A | 7/1977 | Huddle | |
| 4,590,714 A | 5/1986 | Walker | |
| 4,678,375 A | 7/1987 | Gagle | |
| 4,878,322 A | 11/1989 | Ikeda | |
| 5,400,549 A | 3/1995 | Morgan | |
| 6,032,433 A | 3/2000 | Hatziathanasiou | |
| 6,145,525 A | 11/2000 | Mooney | |
| 6,361,249 B1 | 3/2002 | Hodgkinson | |
| 6,517,285 B2 | 2/2003 | Hill | |
| 6,564,513 B2 | 5/2003 | Henbid | |
| 2005/0076602 A1* | 4/2005 | Routhier | 52/698 |
| 2006/0198717 A1* | 9/2006 | Fuest | 411/401 |

FOREIGN PATENT DOCUMENTS

CA   2359515 A1   4/2003

OTHER PUBLICATIONS

Danesh, S., et al., "Development of a Negative Air Pressure Cover System for Earthen Manure Storages," DGH Engineering Ltd., Manitoba, Canada, available at least as early as 2003.

* cited by examiner

*Primary Examiner*—Jack W. Lavinder  
(74) *Attorney, Agent, or Firm*—Christensen O'Connor Johnson Kindness PLLC

(57) ABSTRACT

An apparatus for connecting pond covers, which includes a shaft having an exterior surface, a first end and a second end. An engagement profile is positioned on the exterior surface at a first end of the shaft. A cable guide is positioned in an intermediate position between the first end and the second end of the shaft, the cable guide being oriented transversely to the shaft. A cable is prevented from removal from the cable guide by the second end of the shaft.

9 Claims, 7 Drawing Sheets

METHOD OF AND APPARATUS FOR CONNECTING FLOATING COVERS

FIELD

The present invention relates to a method and associated apparatus which can be used to connect floating covers.

BACKGROUND

U.S. Pat. No. 5,400,549 (Morgan) discloses a pond cover which consists of a plurality of cover panel units connected together with cable connectors.

SUMMARY

According to one aspect there is provided an apparatus for connecting floating covers, which includes a shaft having an exterior surface, a first end and a second end. An engagement profile is positioned on the exterior surface at a first end of the shaft. A cable guide is positioned in an intermediate position between the first end and the second end of the shaft, the cable guide being oriented transversely to the shaft. A cable is prevented from removal from the cable guide by the second end of the shaft.

According to another aspect there is provided a method of connecting floating covers. A first step involves providing two floating covers having grommets positioned along a peripheral edge which define floating cover attachment openings, along with the above described apparatus for connecting floating covers. A second step involves overlapping the peripheral edge of the two floating covers with the floating cover attachment openings of the two floating covers axially aligned. A third step involves inserting the first end of the shaft of one of the apparatus for connecting floating covers into one of the floating cover attachment openings, with the engagement profile preventing removal of the shaft from the floating cover attachment openings. (Note that these covers could be installed on ponds and as tank covers).

BRIEF DESCRIPTION OF THE DRAWINGS

These and other features will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION

Figure 1:
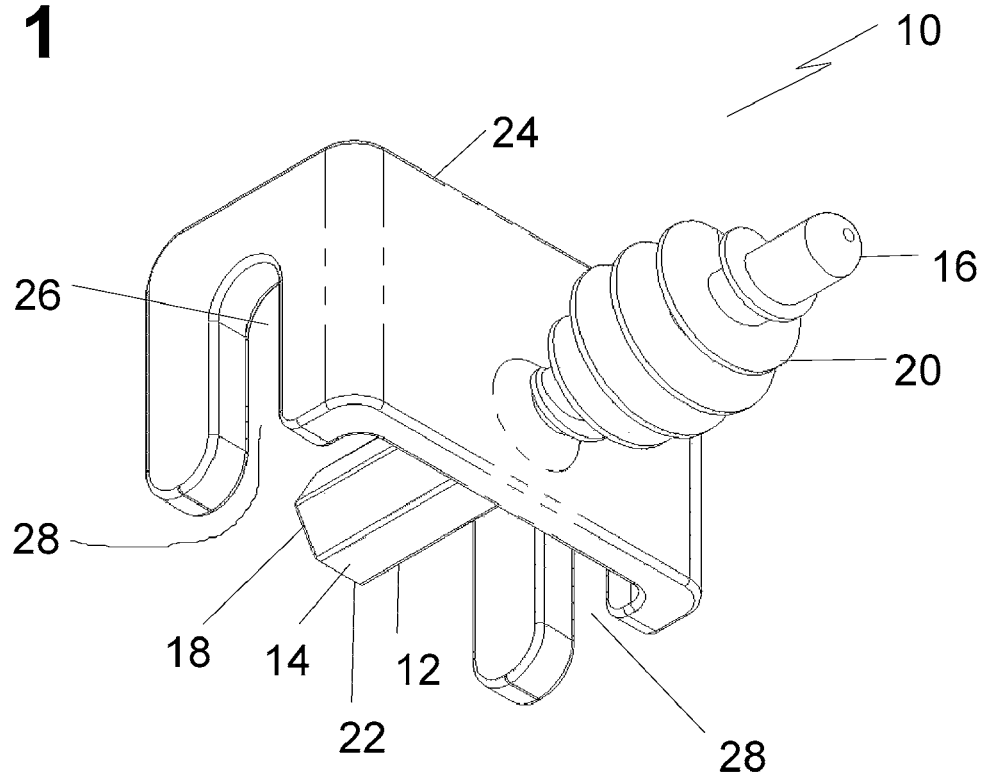
FIG. 1 is a perspective view of an apparatus for connecting floating covers.

An apparatus for connecting floating covers generally identified by reference numeral 10, will now be described with reference to FIG. 1 through 12.

Figure 2:
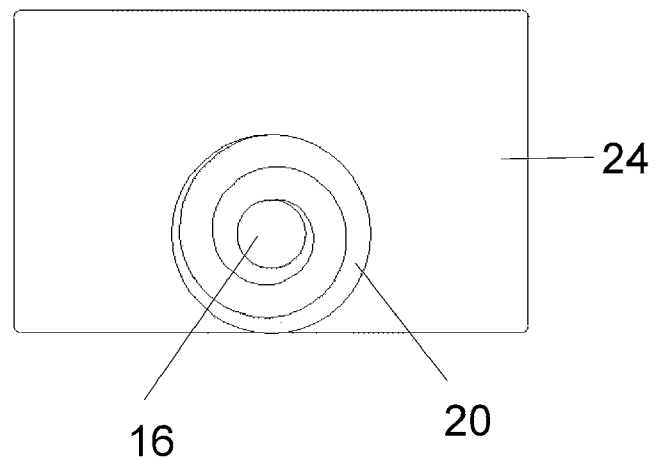
FIG. 2 is a front elevation view of the apparatus for connecting floating covers illustrated in FIG. 1.
Figure 3:
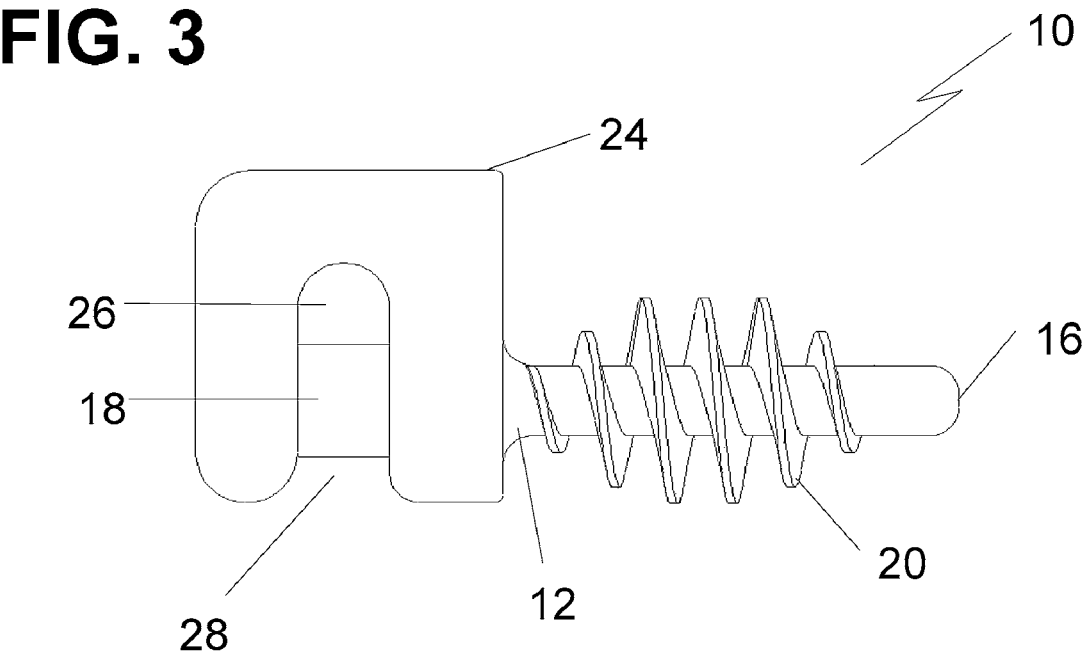
FIG. 3 is a left side elevation view of the apparatus for connecting floating covers illustrated in FIG. 1.
Figure 5:
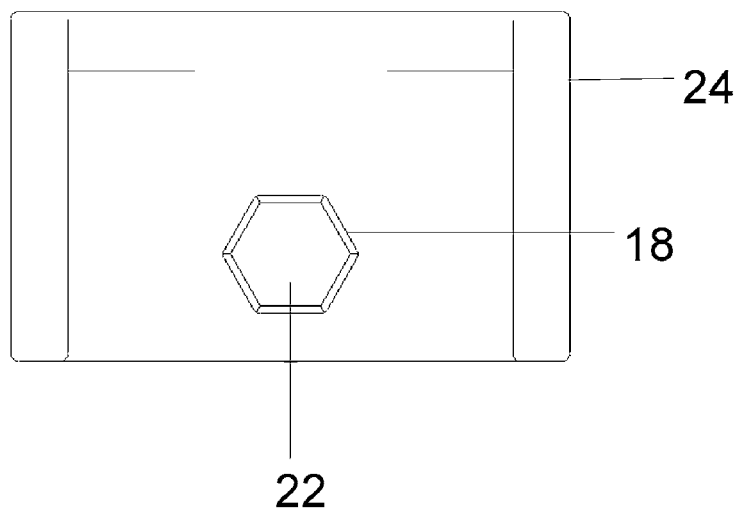
FIG. 5 is a rear elevation view of the apparatus for connecting floating covers illustrated in FIG. 1.
Figure 6:
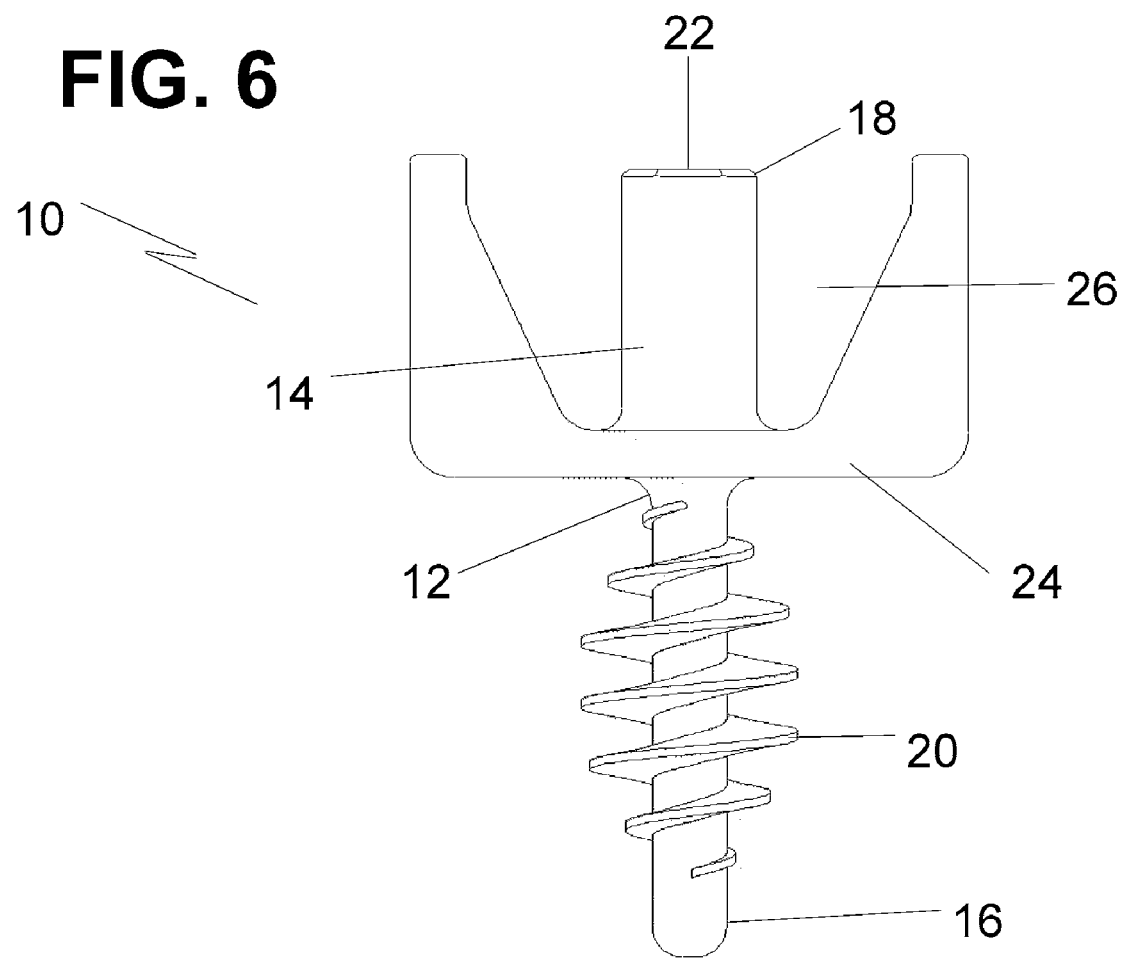
FIG. 6 is a top plan view of the apparatus for connecting floating covers illustrated in FIG. 1.
Figure 7:
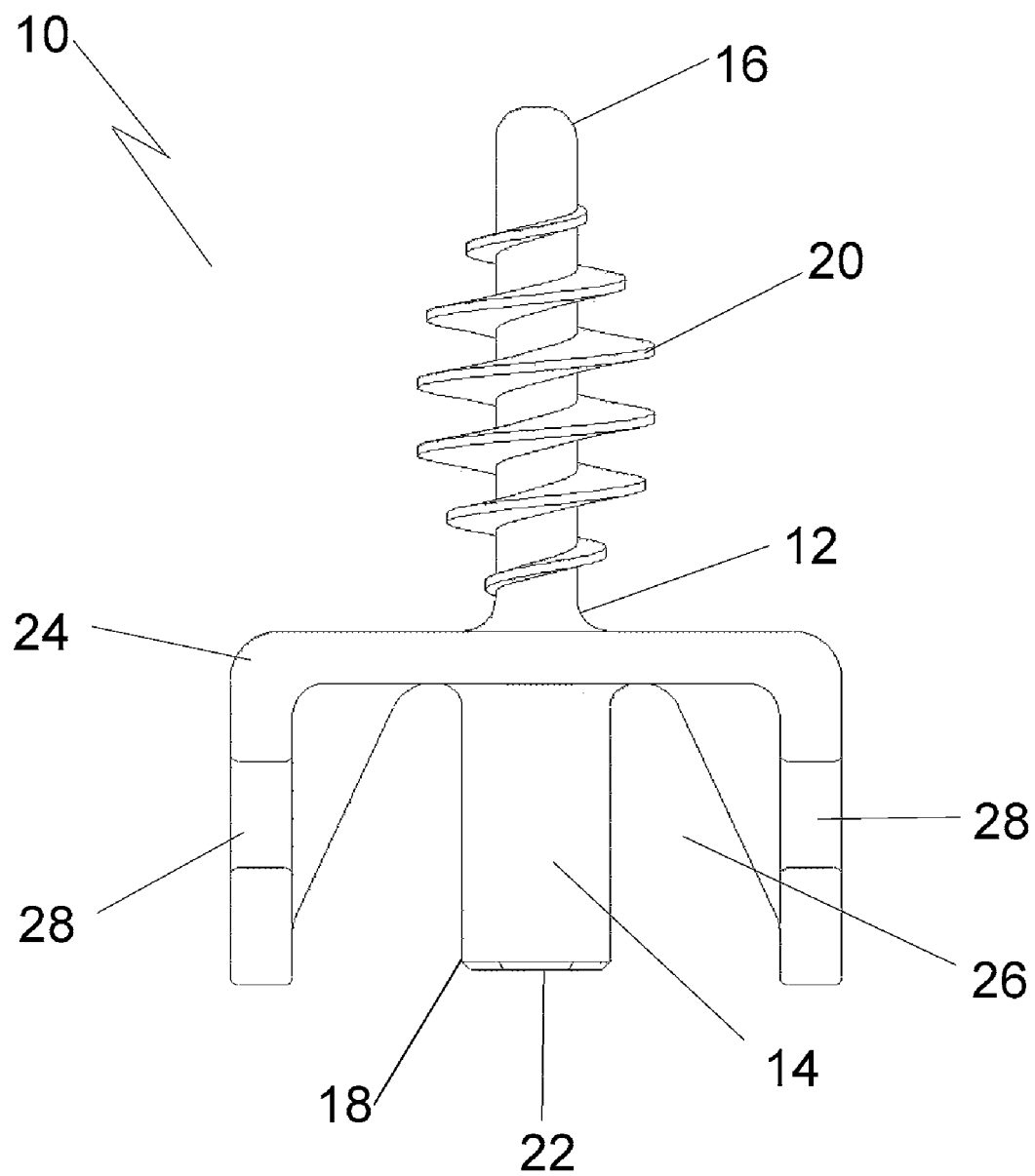
FIG. 7 is a bottom plan view of the apparatus for connecting floating covers illustrated in FIG. 1.
Figure 10:
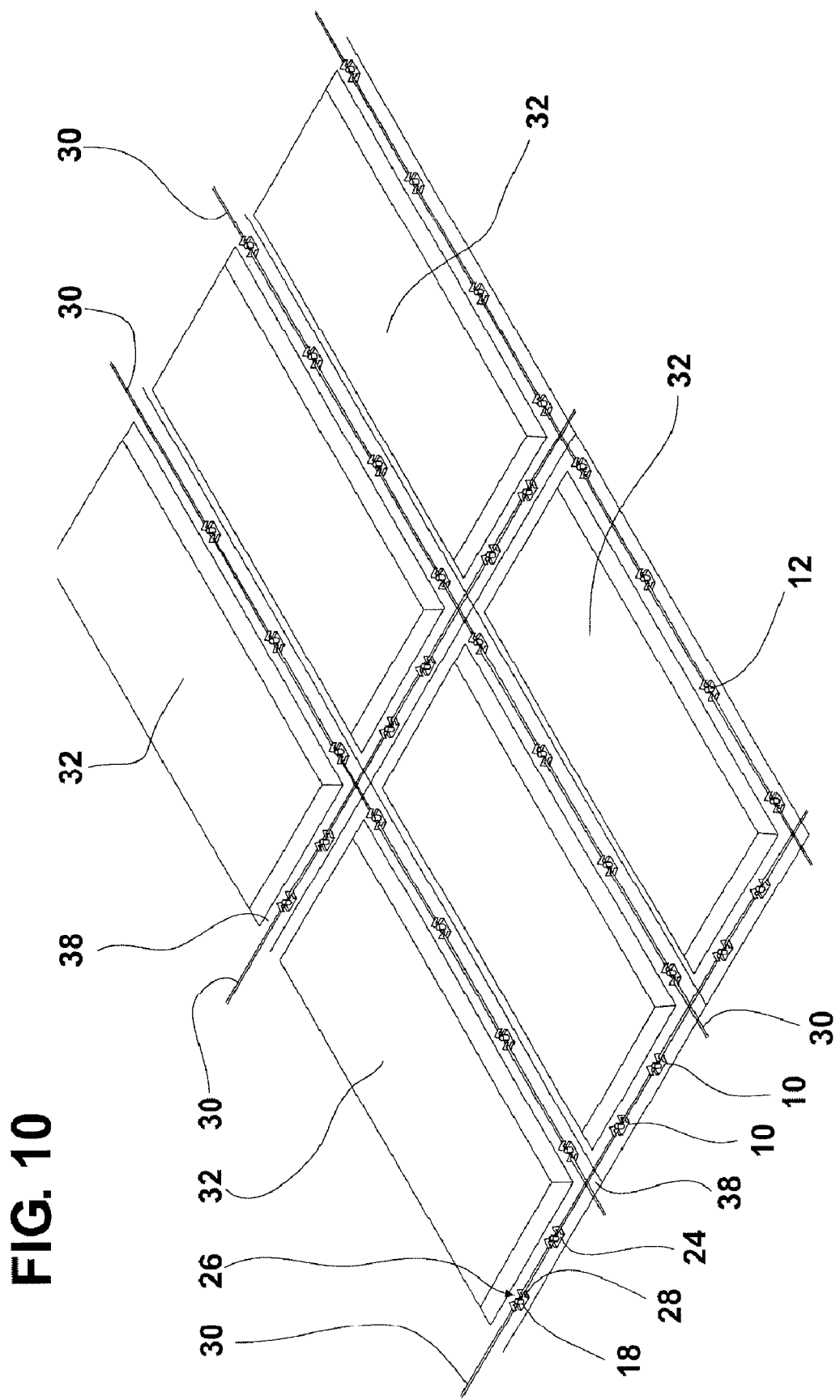
FIG. 10 is a top perspective view of floating covers connected with the apparatus for connecting floating covers illustrated in FIG. 1.

Structure and Relationship of Parts:

Referring to FIG. 1, apparatus 10 has a shaft 12 having an exterior surface 14, a first end 16 and a second end 18. Referring to FIG. 2 and FIG. 3, an engagement profile 20, in the form of helical thread, is positioned on the exterior surface 14 at first end 16 of shaft. Referring to FIG. 1 and FIG. 5, a hexagonal head rotational drive adaptor 22 is positioned at second end 18 of shaft 12. Referring to FIG. 1 and FIG. 7, a cable guide 24 is positioned in an intermediate position between first end 16 and second end 18 of shaft 12. Cable guide 24 is oriented transversely to shaft 12 and has a cable retention channel 26 and a cable access slot 28. A cable may be retained in cable retention channel 26 by the positioning of second end 18 of shaft 12 between cable retention channel 26 and cable access slot 28, this is illustrated in FIG. 10 in relation to cable 30.

Figure 8:
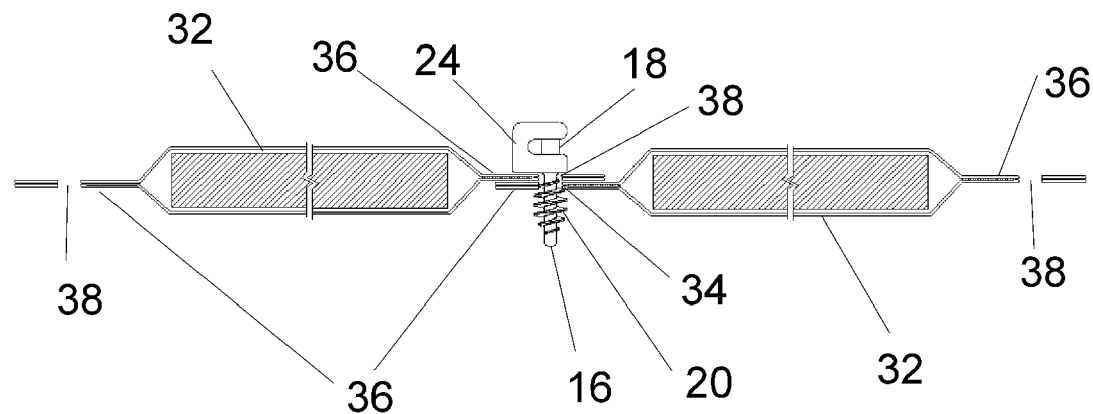
FIG. 8 is a side elevation view, in section, of two floating covers connected with one of the apparatus for connecting floating covers illustrated in FIG. 1.

Operation:

Referring to FIG. 8, a method of connecting floating covers 32 is illustrated. Floating covers 32 may be used as covers for ponds, pools, tanks, etc. While the description below refers to pond covers, it will be understood that it may also be used in other situations. At least two pond covers 32 are required. Each pond cover 32 has holes 34 positioned along a peripheral edge 36. Holes 34 define pond cover attachment openings 38 and provide for apparatus 10 to connect the pond covers 32. Peripheral edge 36 of two pond covers 32 are overlapped with the pond cover attachment openings 38 axially aligned. To connect pond covers 32 insert first end 16 of shaft 12 of apparatus 10 into one of the pond cover attachment openings 38. Engagement profile 20 engages with holes 34 to ensure that pond covers 32 remained aligned and connected at peripheral edge 36. This enables several pond covers 32 to be connected to create a pond cover sufficient to cover the size of pond.

Figure 4:
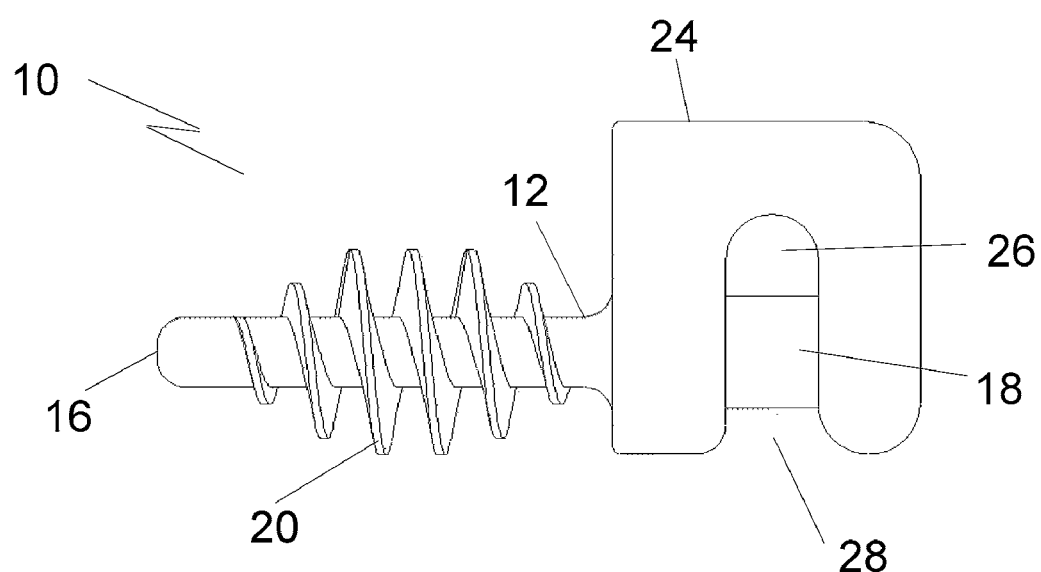
FIG. 4 is a right side elevation view of the apparatus for connecting floating covers illustrated in FIG. 1.

Referring to FIG. 4 and FIG. 8, as engagement profile 20 is helical, a power drill (not shown) is attached to rotational drive adaptor 22 which is positioned at second end 18 of shaft 12, and can be seen in FIG. 5. The power drill provides the means for engagement profile 20 and holes 34 to interact and secure the two pond covers 32 together. Referring to FIG. 10, cable 30 is secured in cable guide 24 at second end 18 of shaft 12.

Advantages:

The use of the above described method allows the pond covers to be rapidly connected. More importantly, portions of the pond covers can be just as rapidly disconnected when access is required to perform servicing. With the prior art, the separation of the pond covers to enable servicing to be performed and the reconnection of the pond covers after servicing has proven to be a major undertaking.

In addition, current cover fastening methods require at least some access to both sides of the cover panel to install or removed the panels, this can be difficult due to panel size (a typical size may be 8'×48'), or panel location, if floating on a liquid surface. However, apparatus can be fully installed or removed from a single side of the cover (typically the dry side).

Figure 9:
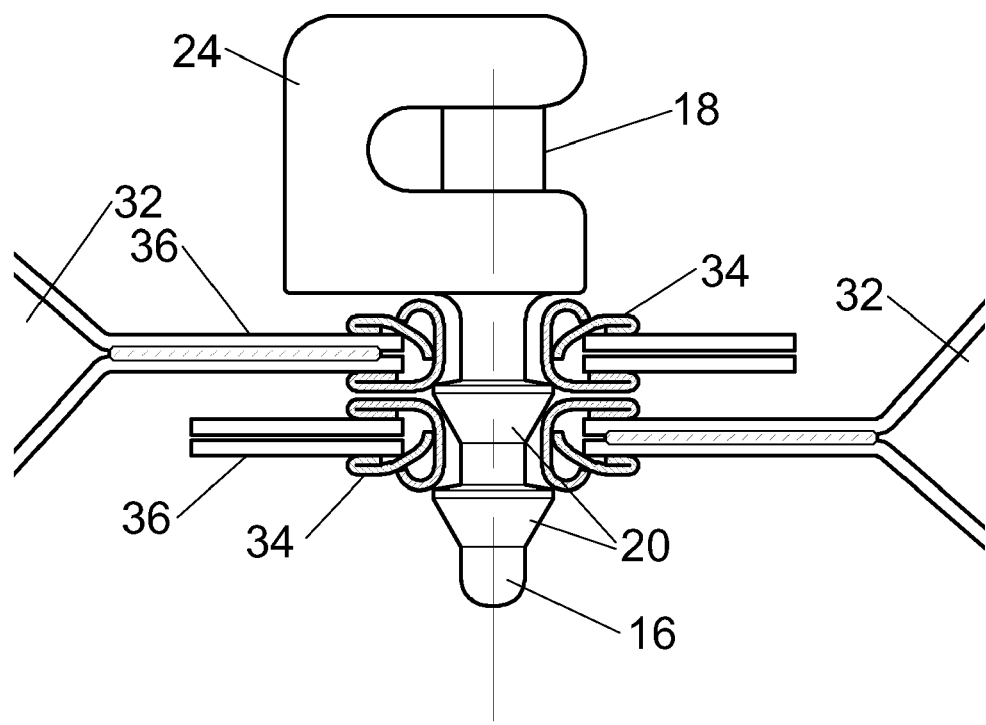
FIG. 9 is a side elevation view of the apparatus for connecting floating covers illustrated in FIG. 1, with an alternative form of engagement profile.
Figure 11:
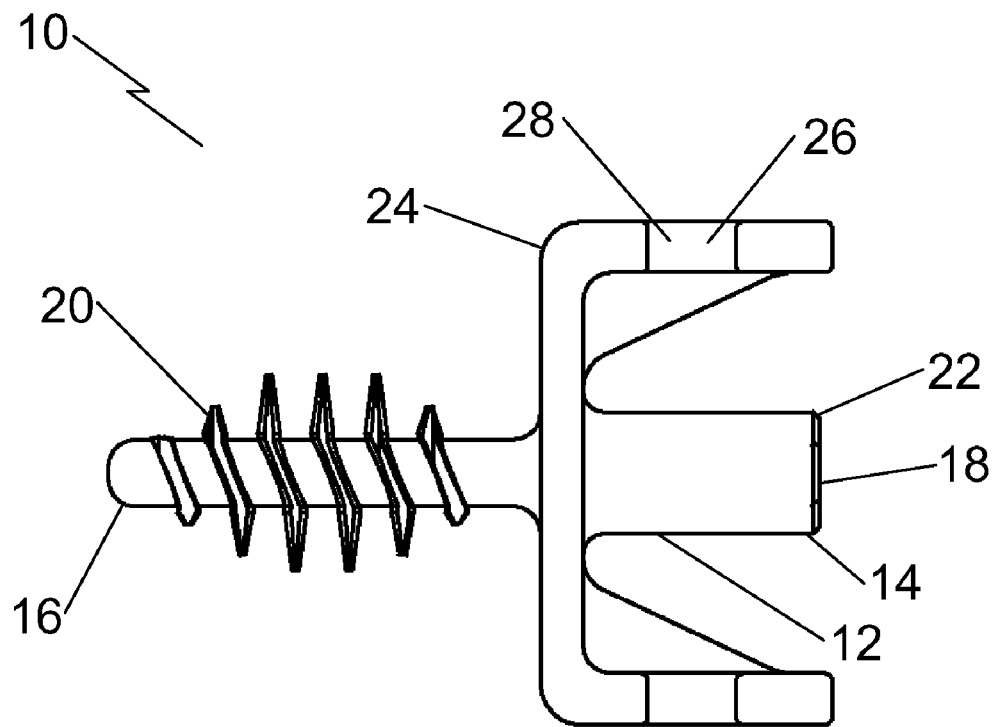
FIG. 11 is a bottom plan view of a variation of the apparatus for connecting floating covers illustrated in FIG. 1.
Figure 12:
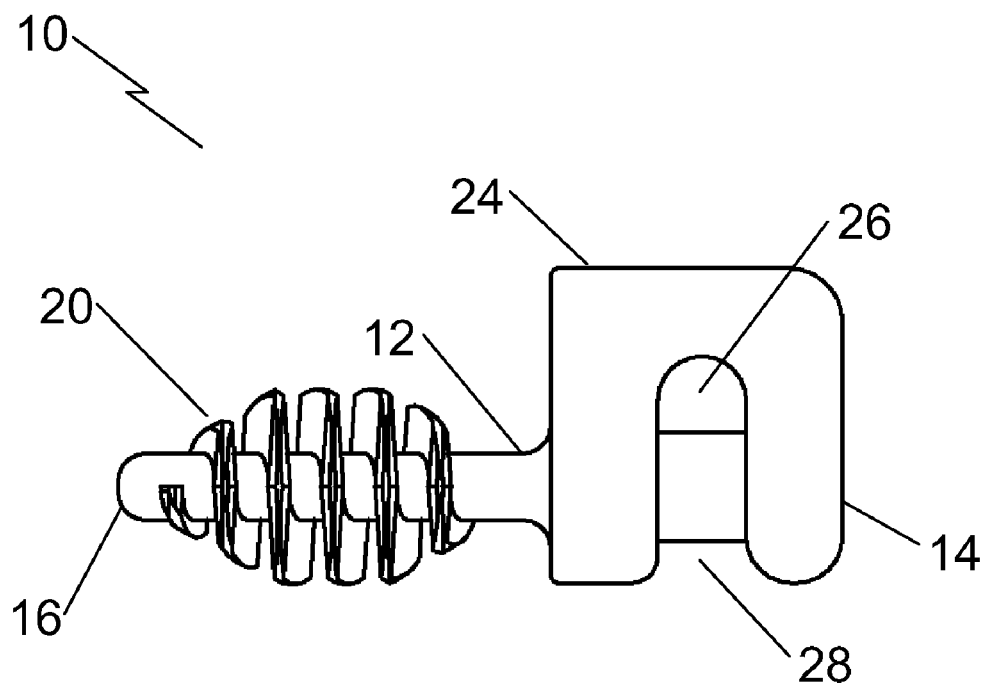
FIG. 12 is a side elevation view of the variation shown in FIG. 11.

Variations:

Although apparatus 10 is shown with a helical engagement profile 20 that works with rotational drive adaptor 22 in FIG. 1 through 8, it will be appreciated that other engagement profiles could be made to work. There are too many alternative engagements to illustrate them all. Referring to FIG. 9, another viable engagement profile 20 could consist of a series of parallel spaced ridges. In addition, different thread forms may also be used. For example, FIGS. 11 and 12 show a step-wise thread form, rather than a continuous thread form as shown in FIG. 1.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiments without departing from scope of the Claims.

What is claimed is:

1. An apparatus for connecting pond covers, comprising:
   a shaft having an exterior surface, a first end, and a second end;
   an engagement profile positioned on the exterior surface at the first end of the shaft;
   a cable guide positioned in an intermediate position between the first end and the second end of the shaft, the cable guide being oriented transversely to the shaft, the cable guide having a cable retention channel and a cable access slot, a cable being retained in the cable retention channel by the positioning of the second end of the shaft between the cable retention channel and the cable access slot.

2. The apparatus of claim 1, wherein the engagement profile is a helical thread.

3. The apparatus of claim 2, wherein a rotational drive adaptor is positioned at the second end of the shaft.

4. The apparatus of claim 3, wherein the rotational drive adaptor is a polygonal drive head.

5. The apparatus of claim 4, wherein the rotational drive adaptor is a hexagonal drive head.

6. The apparatus of claim 1, wherein the engagement profile is a series of parallel spaced ridges.

7. An apparatus for connecting pond covers, comprising:
   a shaft having an exterior surface, a first end, and a second end;
   an engagement profile in the form of helical thread positioned on the exterior surface at the first end of the shaft;
   a hexagonal head rotational drive adaptor positioned at the second end of the shaft;
   a cable guide positioned in an intermediate position between the first end and the second end of the shaft, the cable guide being oriented transversely to the shaft, the cable guide having a cable retention channel and a cable access slot, a cable being retained in the cable retention channel by the positioning of the second end of the shaft between the cable retention channel and the cable access slot.

8. A method of connecting pond covers, comprising:
   providing two pond covers, each pond cover having grommets positioned along a peripheral edge which define pond cover attachment openings; and
   providing apparatus for connecting the two pond covers, the apparatus comprising:
      a shaft having an exterior surface, a first end, and a second end;
      an engagement profile positioned on the exterior surface at the first end of the shaft; and
      a cable guide positioned in an intermediate position between the first end and the second end of the shaft, the cable guide being oriented transversely to the shaft, a cable being prevented from removal from the cable guide by the second end of the shaft;
   overlapping the peripheral edge of the two pond covers with the pond cover attachment openings of the two pond covers axially aligned; and
   inserting the first end of the shaft of the apparatus into one of the pond cover attachment openings with the engagement profile preventing removal of the shaft from the pond cover attachment openings.

9. The method of claim 8, the engagement profile being a helical thread, a rotational drive adaptor being positioned at the second end of the shaft, and the step of inserting the first end of the shaft into one of the pond cover attachment openings being performed using a power drill.

* * * * *

UNITED STATES PATENT AND TRADEMARK OFFICE
CERTIFICATE OF CORRECTION

| | | | |
|---|---|---|---|
| PATENT NO. | : 7,793,390 B2 | | Page 1 of 1 |
| APPLICATION NO. | : 11/833922 | | |
| DATED | : September 14, 2010 | | |
| INVENTOR(S) | : J. A. Mills et al. | | |

It is certified that error appears in the above-identified patent and that said Letters Patent is hereby corrected as shown below:

| COLUMN | LINE | ERROR |
|---|---|---|
| Title Page insert item (30) | Foreign Appl. Priority Data | --(30) Foreign Application Priority Data Jul. 4, 2007 (CA) ..........2593460-- |

Signed and Sealed this
First Day of February, 2011

David J. Kappos
*Director of the United States Patent and Trademark Office*